United States Patent [19]

McMullen et al.

[11] 4,108,188
[45] Aug. 22, 1978

[54] SAND COOLER CONTROL SYSTEM

[75] Inventors: Carl R. McMullen, Waverly, Tenn.; Gary M. Schlageter, Carpinteria, Calif.

[73] Assignee: Foundry Technology, Inc., Waverly, Tenn.

[21] Appl. No.: 818,655

[22] Filed: Jul. 25, 1977

[51] Int. Cl.² .................. B08B 3/02; B22C 5/08
[52] U.S. Cl. ................ 134/57 R; 164/5; 164/154
[58] Field of Search ........... 134/57 R, 113; 164/5, 164/154

[56] References Cited

U.S. PATENT DOCUMENTS

| | | | |
|---|---|---|---|
| 2,273,126 | 2/1942 | McGillin | 134/57 R |
| 3,092,882 | 6/1963 | Dietert | 134/57 R X |
| 3,172,175 | 3/1965 | Hartley | 134/57 R |
| 3,221,381 | 12/1965 | Nutter | 134/57 R X |
| 3,223,964 | 12/1965 | Stadlin | 164/154 UX |
| 3,373,753 | 3/1968 | Jacob | 134/57 R X |
| 3,867,640 | 2/1975 | Paulsen | 134/57 R X |
| 3,958,623 | 5/1976 | Vissers et al. | 164/5 X |

*Primary Examiner*—Robert L. Bleutge
*Attorney, Agent, or Firm*—Cameron, Kerkam, Sutton, Stowell & Stowell

[57] ABSTRACT

A sand cooler control system for a sand casting foundry system incorporates a cooling system positioned downstream of the shakeout station where castings are separated from the hot sand. The amount of cooling fluid utilized in the cooling process is controlled by a digital system responsive to the total heat (BTU) content of the sand as determined by a combined function of sand temperature and volume. The temperature and volume parameters are determined by non-contact sensors which take the form of an infrared sensor and sonic sensor, respectively.

5 Claims, 3 Drawing Figures

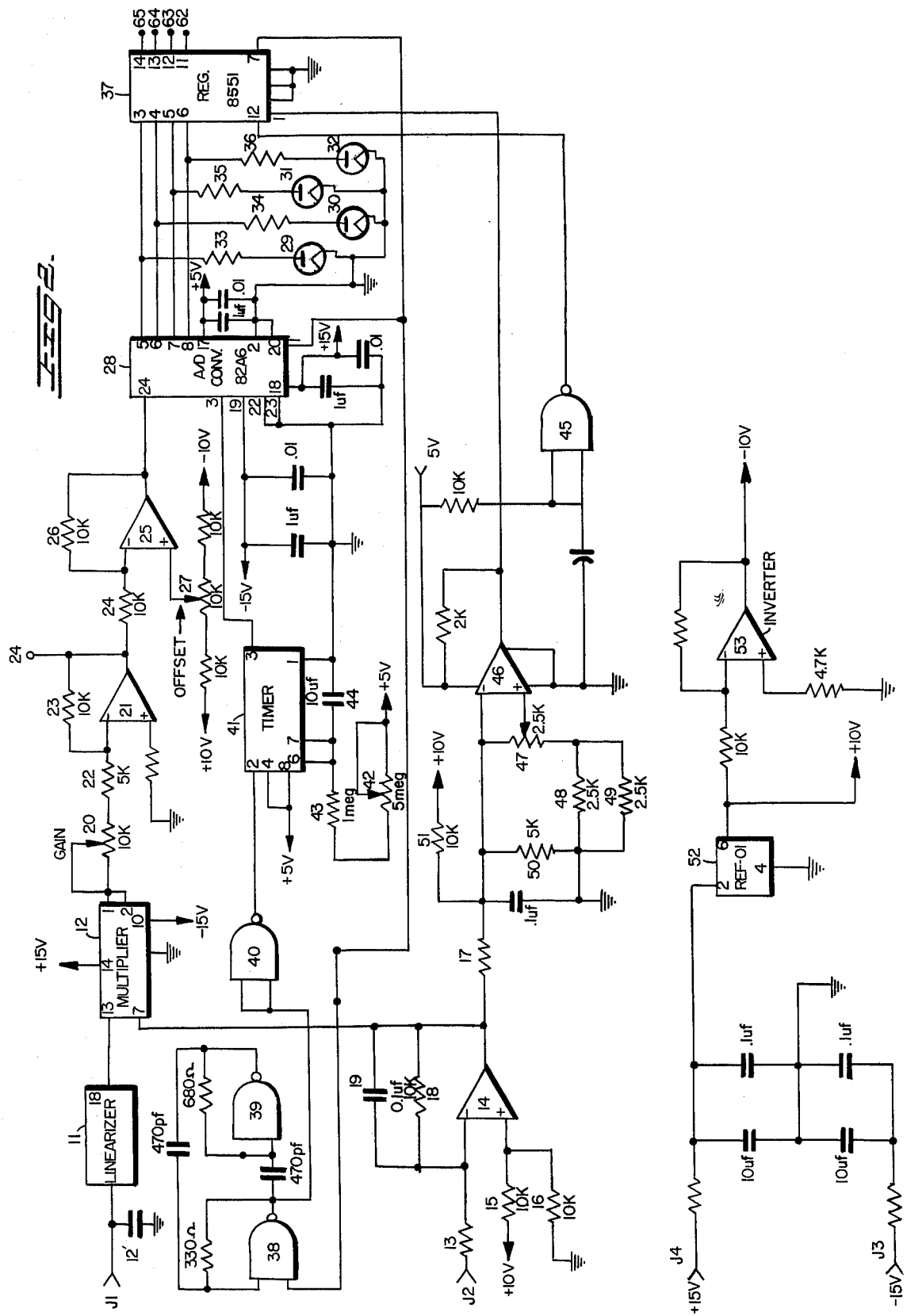

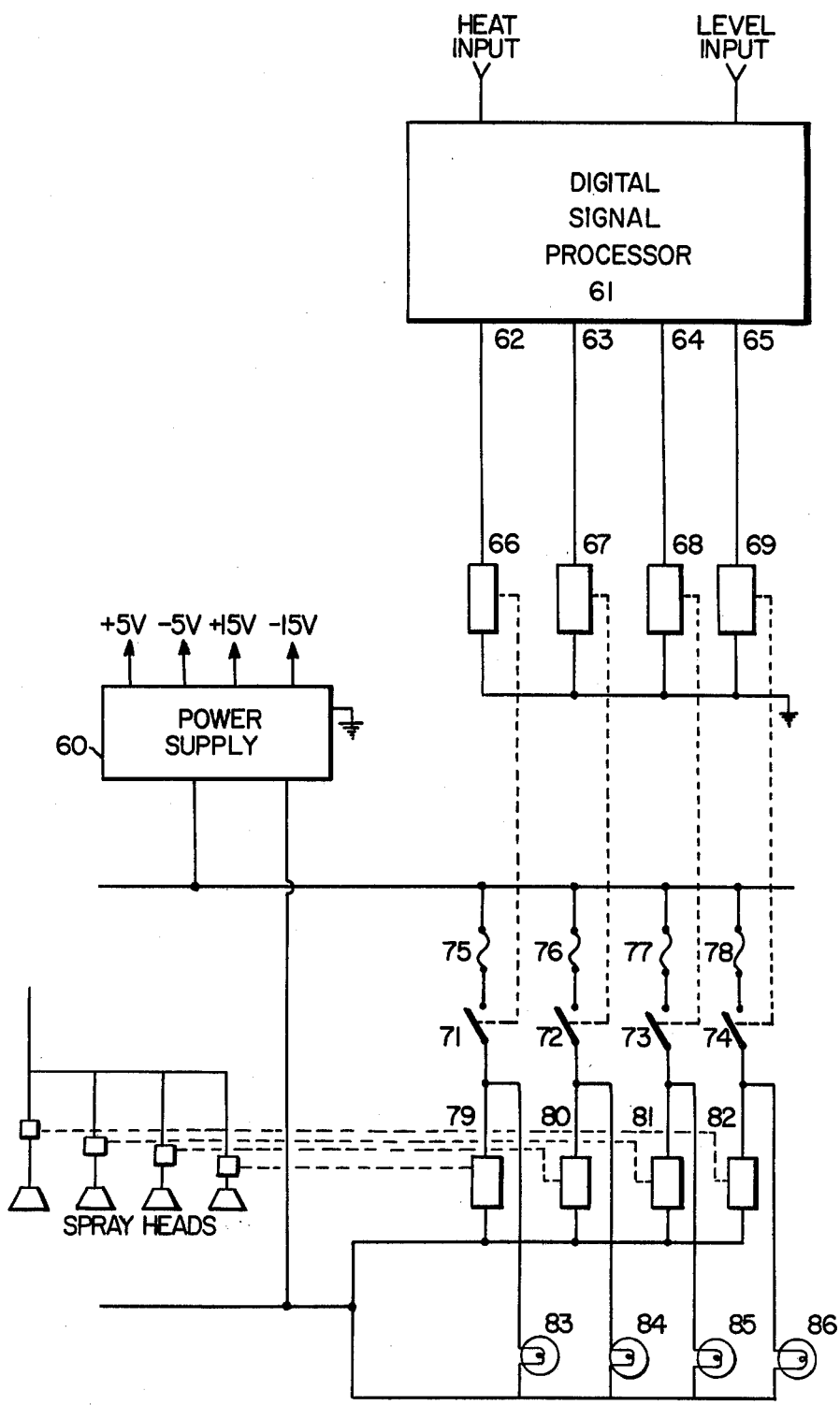

SAND COOLER CONTROL SYSTEM

This application is related to application Ser. No. 818,653 of Carl R. McMullen assigned to the assignee of the present invention.

THE INVENTION

This invention relates to non-contact sensing of the BTU content of hot mold forming material such as, for example, foundry sand, separated from cast articles in a sand casting foundry system and means to control the application of cooling liquid such as water to the separated material which is recirculated to molding devices for reuse.

BACKGROUND OF THE INVENTION

The most commonly used type of molding process involves sand casting wherein a casting is formed in a sand mold, the mold being formed of a material comprising a mixture of sand grains, clay, water and additives used to improve such properties as thermal stability, surface finish, and hot strength. For convenience, this mold forming material will be referred to herein as foundry sand, or more simply sand as the greater proportion of this material is sand.

In forming a mold of this type, the foundry sand is packed around a suitable pattern, the foundry sand and pattern being surrounded by a container or flask of suitable size. The foundry sand is generally rammed in place by molding machines to produce the desired degree of packing by a squeezing action, a jolting action, a combination of squeezing and jolting or by a throwing or slinging action. The mold is then split into two halves, the cope and the drag, and the mold is ready for casting. The two halves of the mold are then closed and clamped or weighted to prevent the cope from floating when the casting is poured.

A second type of sand casting, commonly known as shell molding, involves the process of permitting sand mixed with a resin binder to come in contact with a pattern heated to an elevated temperature, approximately 350 to 500. Excess sand mixture is removed, leaving a thin shell of sand-plastic mixture adhering to the pattern. After heating in an oven to cure the shell, the latter is stripped from the pattern by an ejecting device. The shell halves are then clamped together and may be backed with a support assembly, for example, metal shot, prior to pouring.

While the above processes are commonly used, the processes have inherent limitations as to the fineness of surface finish, the presence of fins on the resulting casting, the presence of flasks and the limitation of speed in developing the molds. In order to alleviate these limitations, a completely automatic flaskless molding machine assembly was developed to permit the manufacture of a continuous flaskless series of molds along a pouring conveyor to form a rectilinear string of molds. Such a machine is produced and marketed under the tradename DISAMATIC and produced by DANSK INDUSTRI SYNDIKAT A/S of Copenhagen, Denmark.

Basically, the DISAMATIC machine contains a molding chamber which consists of four fixed walls and two movable walls, the first being characterized a counter pressure plate which carries the front pattern plate and the squeeze plate which forms the rear closing wall for the molding chamber. The counter pressure plate forms one-half of the mold to be mated with the other half of the mold of the preceding mold and the squeeze plate carries the rear patern for the half of the mold to be mated with a succeeding mold. Thus, such mold formed in the molding chamber contains both halves of the mold which are integrally formed, the front half of the mold being adapted to be mated with a preceding mold and the back half being adapted to be mated with a succeeding mold. The counter pressure plate is adapted to be tilted to the horizontal position after the mold is formed and the squeeze plate is adapted to be mounted or forms the front portion of a hydraulic ram system, the hydraulic ram system being utlized to provide the hydraulic pressure to squeeze the mold and also to provide the force necessary to carry the formed mold out of the DISAMATIC machine. The DISAMATIC machine also includes a sand hopper from which sand is fed into the molding chamber positioned therebelow under controlled pressure conditions.

In operation, the molding chamber is connected to the sand hopper through an injection slot in the top of the mold chamber. The filling process is controlled by a level indicator incorporated in the sand hopper and sand is fed into the molding chamber by means of compressed air which forces the sand through the injection slot. After filling, the front tiltable pattern plate, referred to above as the counter pressure plate, is kept in a fixed position and the rear squeeze plate is moved forward under the force of the hydraulic piston to compress the sand within the molding chamber. The squeeze plate stops this movement when the pressure on the mold face has reached the desired value, which value may be adjusted. During the squeeze operation a vibratory motion may be introduced to the pattern to insure uniform density of the sand. After sufficient pressure is achieved in the mold, the front pattern plate is vibrated to strip the mold from the front pattern plate and the front pattern plate is tilted up to a horizontal position so that the molding chamber is open in the front. The rear pattern plate is then actuated by the hydraulic cylinder to push the formed mold out of the molding chamber and into engagement with the previously manufactured mold, certain of the preceding molds being supported on a table extending from within the mold chamber to a position exterior to the mold chamber. The rear pattern plate is vibrated after it has concluded its movement to the front position to strip the rear pattern plate from the formed mold. The piston is then returned to its starting position and the mold chamber is again closed to repeat the process of manufacturing a succeeding mold.

From the foregoing, it is seen that a mold is pushed into mating engagement with a previously manufactured mold to form a mold cavity therebetween, the molds being adapted to exactly mate and eliminate the fin line. As each succeeding mold is manufactured and pushed into engagement with the previously manufactured mold, the entire string is pushed forward on to a conveyor assembly, the conveyor assembly being operated by suitable rotary power devices. The molds are then conveyed to a pouring station wherein molten metal is poured into the mold cavity.

As may become apparent from the foregoing description, certain pressures are generated along the longitudinal direction of the series of mating molds, which pressures increase as the number of molds increases and, under certain conditions, may be greater than the unsupported molds may be able to withstand. Under these conditions, the molds may be crushed by the conveying force of the hydraulic ram. This undesirable crushing action of the molds is presented by sliding the manufactured molds a short distance across a supporting table by means of hydraulic ram, the molds then being positioned on a conveyor belt for movement toward a pouring and ultimate shakeout station. In conveying the molds to the pouring station, it is imperative that a certain degree of pressure be created and maintained across the face of the mold halves to insure that a proper mating of the molds is achieved during the molding process. This is accomplished by controlling the drive motor for the conveyor belt in accordance with the sensed pressure across the face of the molds, thus solving the problem of crushing of the molds and achieving uniform pressure across the mating mold halves.

The filled molds are transported from the pouring station to the shakeout station by an extension of the conveyor belt which transported the empty molds from the molding machine to the pouring station. By the time the filled molds reach the shakeout station, the metal within the molds has hardened sufficiently to retain its shape and the molds are agitated with sufficient violence to cause the molds to disintegrate. The sand residue from the disintegrated molds fall through a trap onto a used sand returned conveyor while the castings are transported to a work receiving station.

In the prior art systems the used sand is passed through a rotary screen to insure that it has been broken down into individual grains suitable for reuse in the molding machine. The rotary screen also serves to aerate and thus cool the sand which is then transported to a return sand holding tank which supplies the sand mix station previously described.

Cooling of the sand is essential inasmuch as the return sand supplied to the DISAMATIC machine for the mold operation should be about 100° F or less, while the temperature of the sand residue from the disintegrated molds may be 220° F or higher, depending on such factors as ambient temperature and humidity and the amount of times the sand has been reused during the course of a day in the molding opertion.

Such prior art systems require a relatively large quantity of sand to be used in the recyle loop so that the sand will have time to cool to a temperature which will permit its reuse in the molding process. This requires an extremely large return sand holding tank and an excessive amount of sand which is costly and inefficient particularly since the sand cools slowly when packed in the holding tank.

Various attempts to solve these drawbacks have been made by providing cooling stations which add cooling water to the sand. Generally, one or more probes are positioned in the sand hopper or Muller to sense either temperature or moisture content. Such probes may take the form of a temperature bulb or thermocouple for sensing temperature or electrical resistance probes for sensing conductivity (moisture). Signals derived from such sensors are used to control the addition of water to the sand. Such systems suffer from the slow response of said sensors. Also, because the sensors are buried in the sand, they do not necessarily reflect true temperature or moisture of the sand at remote areas. Typical examples of such measuring systems are illlutrated and described in U.S. Pat. Nos. 2,277,953, 2,825,946; 2,886,868; 3,083,423; 3,090,091; 3,172,175; 3,250,287; 3,580,422; Reissue 25,282; 3,601,373 and 3,958,623.

One attempt to solve the drawbacks of prior art systems included provision for measuring the volume of sand carried on a conveyor and the temperature of the sand. Such an arrangement is shown in U.S. Patent 3,601,373 wherein movable feeler is caused to shift in accordance with the sand level to correspondingly position a movable coil of a transformer and compensate for changes in volume. Problems with this type of system may include mechanical jamming or follow up of the roller feeler, slowness in response and inaccurate readings due either to wear of the feeler element of displacement of sand by the feeler with changes in height thereof. The temperature probe, of course, is subject to the disavantages hereinbefore set forth.

Another attempt to solve these drawbacks in the prior art were made by providing a water quenching device at the shakeout station which sprayed cooling water onto the sand. The cooling water reduced the temperature of the sand and permitted the use of smaller holding tanks. However, to prevent the application of excess water which would mend the sand, the amount of water to be sprayed on the hot sand for cooling purposes was governed by a contact temperature sensing element. While this element provided temperature data, such data was not accurately related to actual heat content of the sand due to the variable volume of sand passing over the sensor. An example of this problem is where a relatively thin layer of hot sand causes an excessive amount of water to be sprayed on the sand causing the sand to be too wet for reuse. Alternately, an exceptionally large volume of moderately hot sand passing over the temperature sensing means would create a signal that would cause an insufficient amount of water to be sprayed over the sand for cooling purposes and the recycled sand would then be too hot for proper molding. The prior art discussed herein may be studied in more detail by referring to the aforementioned U.S. Patents and in particular to U.S. Pat. No. 3,601,323 on "Moisture Controller", issued to Nelso Hartley on Aug. 24, 1971; U.S. Pat. No. 3,800,935 on "Conveyor Drive Control System" issued to Clifford S. Montgomery on Apr. 2, 1974; and U.S. Pat. No. 3,958,623 on "Cooler-Dryer For Casting and Molding Sand" issued to Pastiaan Zissers et al, on May 25, 1976.

OBJECTIVES OF THE INVENTION

The limited ability of the prior art systems to cope with variations in the total heat content of sand at the cooling station has been overcome by the present invention. To this end, a process and associated apparatus have been devised and are described herein which will meter cooling water to the foundry sand as a function of the absolute thermal (BTU) content as determiend by monitoring by non contact sensors both the temperature and volume of the sand. Advantageously, sensing is accomplished with respect to recycled foundry sand prior to its entering the cooling station.

A further objective of the present invention is to provide a precise quantity of cooling fluid, such as water, to a predetermined volume of hot foundry sand to reduce its temperature to below a predetermined level.

Another objective of the present invention is to measure the heat content of a quantity of foundry and with non-contact temperature and volume sensing means.

A still further objective of the present invention is to digitally process signals representing volume and temperature of sand in a predetermined zone in a conveyor system and utilize the digitally processed signals to activate water valves.

A further objective of the present invention is to provide an automatic means to remove excess heat from recycled sand in a sand cast foundry system.

Another objective of the present invention is to provide a means to control the application of cooling water to recycled sand in a foundry which does not include mechanical parts or sensors which come in contact with the recycled material.

Another objective of the present invention is to provide a plurality of water valve responsive to predetermined signals for administering predetermined quantities of quenching water to recycled sand in a foundry system as a function of activation and inactivation of predetermined valves.

It is a still further objective of the present invention to provide an economically produced and relatively maintenance free automatic system to add cooling water to recycled sand in a sand casting foundry system as a function of the total BTU content of the foundry sand.

Another objective is to position the water cooling station in the return loop for recycled foundry sand downstream of the cast item separation station to eliminate wetting the cast items.

A further objective of the present invention is to provide a means to cool recycled foundry sand in a sand casting foundry system so that a minimum quantity of make-up and is required for continual operation.

The foregoing and other objectives of the invention will become apparent in light of the drawings, specification and claims contained herein.

SUMMARY OF THE INVENTION

The present invention is an improvement to a continuous sand casting foundry system of the type which recycles casting sand to minimize the attended problems related to processing large quantities of sand and provides a system for controlling the application of cooling water to hot sand utilizing non-contact sensors. The disclosed system incorporates an infrared temperature sensor and an ultrasonic level sensor to provide a pair of signals representing both temperature and volume of the used sand. The temperature and volume representative electrical functions are combined in an analog fashion and then digitized to control in digital fashion a plurality of water application nozzles which apply cooling water to the recycled sand after the sand and cast items have been separated.

DESCRIPTION OF THE DRAWINGS

FIG. 2 is a schematic diagram of the circuitry of the present invention adapted to convert electrical functions of sand heat and level into digital signals.

FIG. 3 is a schematic diagram of the water application valve system of a preferred embodiment of the present invention.

DESCRIPTION OF THE INVENTION

Figure 1:
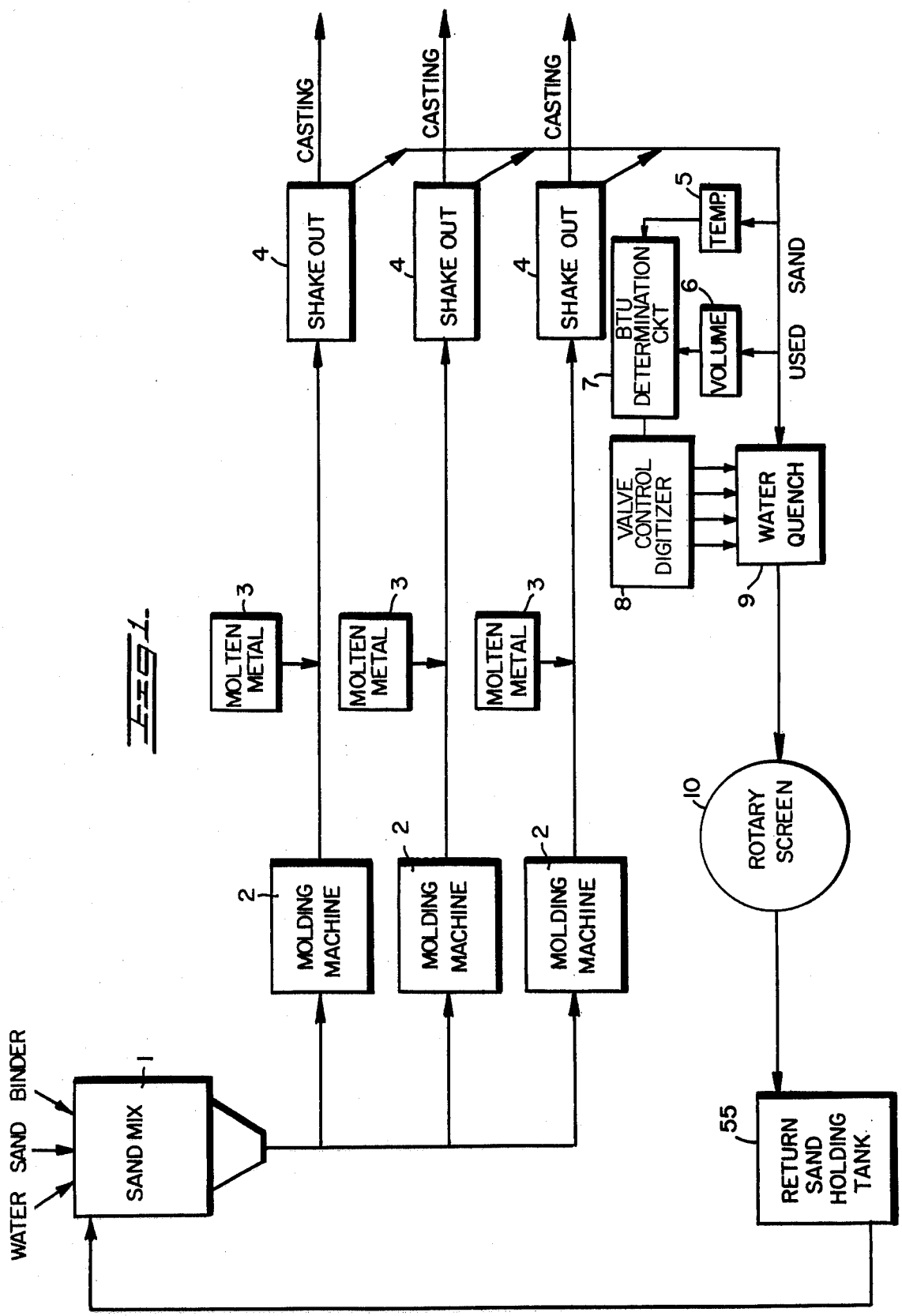
FIG. 1 is a functional block diagram of continuous sand casting foundry system incorporating the sand cooling system of the present invention.

FIG. 1 illustrates a typical sand casting foundry system incorporating the advantage provided by this invention. Sand mix station 1 may comprise a conventional muller or mixer which may be of the type shown in U.S. Pat. No. 3,580,422 that combines fresh make-up sand with return sand and water and a binder to make a homogeneous mixture. This foundry sand is fed via the lower hopper to a belt conveyor and is of a consistency which enables it to be packed about a pilot model in one of the aforementioned DISAMATIC high pressure molding machines 2 and retain its shape while being separated from the pilot model and combined with another mold half. Two sand mold halves are held together by elements of the system and transported along the belt conveyor to a molten metal pouring station 3 wherein the mold cavities are filled with molten metal.

In a typical foundry, several production lines may be operating simultaneously. FIG. 1 illustrates a three line operation wherein the foundry sand is fed to three separate parallel conveyor systems. Since each production operates in a similar fashion, for the sake of brevity, the operation of only one line will be described, but it should be noted that like elements have been designated with like reference characters.

The foundry sand mixture forming the mold, extracts some of the heat from the molten metal which was poured into the mold cavity and the metal solidifies as the mold is transported along the conveyor belt to a conventional shakeout station 4. At the shakeout station the molds are vibrated or agitated sufficiently to separate the casting from the sand and the sprue is separated from the casting manually. The castings are conveyed to a work receiving station, while the hot sand is passed through a screen on a transversely arranged belt conveyor to be recycled to a return sand holding tank.

After the shakeout station 4, the hot sand which may be between 150 – 325 in the sand recycled loop passes a temperature sensing station 5, a volume sensing station 6 and a cooling or water quench station 9. The temperature sensing station includes a noncontact temperature sensor which in a preferred embodiment is an infrared sensor which provides an electrical signal representing sand temperature without the necessity of coming into contact with the sand. At approximately the same point in the sand recycle loop, the volume sensing station 6 also is provided with a noncontact sensor which in a preferred embodiment is an ultrasonic sensor positioned above the moving belt and arrange to measure the precise height of the sand on the conveyor. These measurements are made over a predetermined increment of time and since the width of the conveyor is known (usually 30 inches), a precise measurement of sand volume obtained. The output of the noncontact sensors comprise electrical signals corresponding to temperature and volume of the return sand. These signals are applied to the BTU determination circuit 7 which combines the output of the infrared temperature sensor 5 with the volume signal from the ultrasonic sensor to create an analog signal that is forwarded to the valve controlled digitizer 8. The valve controlled digitizer generates signals similar to digital signals commonly used to energize digital displays for numerical readouts. However, in this application the digital signals are utilized to activate one or more individual valves controlling associated water quench nozzles at the water coating or quench station 9. The water quench nozzles are calibrated to deliver in response to the applied signals, different quantities of water to the hot sand. By selectively enabling the nozzles through the valve control digitizer, a precise quantity of water is sprayed over the sand to reduce its temperature. Advantageously, the sand is cooled to a temperature below 110° F and 140° F.

The cooled sand is then transported to the rotary screen 10 which assures that the sand is broken down into individual grains before it is transported to the return sand holding tank 55. This rotary screen also provides a slight additional cooling effect due to tumbling and aeration of the sand. From the return sand hold tank, the cooled sand is transported to the sand mix station as required and the loop is complete.

In a preferred embodiment the temperature sensor 5 of FIG. 1 is an infrared sensor model TD22 manufactured by Infra Red. The volume sensor 6 in this preferred embodiment is an ultrasonic level monitor such as the model SLM2 manufactured by Weismar of 905 Dexter Avenue North, Seattle, Washington 98109.

The output of the infrared temperature sensor is a signal ranging from 0–10 volts representing the temperature of the sand. This signal is applied to input jack J1 of FIG. 2 and then to a linearizer 11. The linearizer is a model E$^2$ manufactured by Thermodot of Carpenteria, California. The combination of the infrared sensor and linearizer produce a linearly varying signal from 0 to 10 volts representing the temperature of the sand varying from ambient to 500° F. A filter capacitor 12 is connected betwen the output of infrared sensor to linearizer 11 and ground to eliminate noise in the form of alternating frequency signals. This insures that the output of the linearizer is a relatively constant signal.

The ultrasonic level monitor produces a signal ranging from 0 to 10 volts representing a distance from the surface of the sand to the transducer of from 12 inches to 16 inches. The 12 inch distance represents the 0 voltage signal and when no sand is on the belt, the output of the monitor is at its maximum. To this end, the ultrasonic transfer is positioned 16 inches from the surface of the conveyor belt. When no sand is present on the conveyor, a 10 volt signal is applied to J2 of FIG. 2.

A resistor 13 may be interposed between J2 and differential amplifier 14 to permit compensation for an ultrasonic level sensing probe output which exceeds the desired 0 to 10 volt range for the distances involved. A resistive network comprised of resistors 15 and 16 is adapted to couple a positive 10 volts to the positive input of differential amplifier 14 so that a 0 output will be provided when a 10 volt signal (no sand on the belt) is applied to the negative input of the differential amplifier via J2.

The output of differential amplifier 14 is applied to one of two inputs of multiplier 12 and to an inhibiting network via resistor 17. The inhibiting network is calculated to prevent addition of water to a relatively thin layer of sand regardless of the output of the temperature sensing means.

To this end, the volume responsive differential amplifier 14 may be considered to function as an operational amplifier. In a preferred embodiment of the present invention, preferably, differential amplifier 14 is an LM324 integrated circuit manufactured by National Semiconductor. Three other amplifiers 21, 25 and 53 are illustrated in FIG. 2. They are all located physically on the same integrated circuit chip LM324 and are adapted to function as operation amplifiers, amplifiers or inverters. The selection of this particular integrated circuit for use in the preferred embodiment was chosen to minimize the number of basic components required by the circuit.

Referring again to FIG. 2, irregularities in the output of differential amplifier 14 are minimized by the RC feedback network comprised of resistor 18 and capacitor 19. The resultant, relatively stable output potential is one of the two inputs to multiplier 12, the other being the output of linearizer 11. Multiplier 12 is a commercially off-the-shelf component manufactured by Burr Brown under their designation 4204J.

Within multiplier 12, the output of linearizer 10 and the output differential amplifier 14 are first multiplied to produce a signal ranging from 0 to 100 volts and then this signal is divided by 10 to produce an output ranging from 0 to 10 volts which is a function of the total heat (BTU) content of the sand passing the control station.

The 0 to 10 volt output of the multiplier 12 is applied to a potentiometer 20 which varies the gain of the multiplier output. This modified analog signal is the water control signal in its basic, analog form.

The water control analog signal is applied to the negative input of amplifier 21 through resistor 22. Amplifier 21 includes a resistive feedback path to the negative input through resistor 23. This amplifier also provides a signal to a test point 24 which is utilized during calibration and service of the system. The signal is also applied through resistor 24 to the negative input of differential amplifier 25 which includes a feedback to the negative input via resistor 26. The positive input to differential amplifier 25 is varied between a −10 volts and a +10 volts by an offset control comprising a voltage divider including variable resistor 27. The function of the offset control circuit is offset the range at which the system functions to apply quenching or cooling water to the hot sand to compensate for various modes of operation.

The gain control and offset analog signal produced at the output of differential amplifier 25, a signal which is applied to input pin 24 of analog-to-digital converter 28.

The analog-to-digital converter 28 may be a standard ADC-Econoverter manufactured by Daytel and identified as model 82A6 or any similar commercial converter which operates to convert the analog input at pin 24 into a four bite output at pins 5, 6, 7 and 8. The four bite output is applied to four digital signal lines connected to register 37 and to light emitting diodes 29, 30, 31 and 32 through 510 ohm resistors 33, 34, 35 and 36. Light emitting diodes 29–32 are provided as indicators at the circuit to enable visual monitoring during test sequences and calibration.

Analog-to-digital converter 28 requires a −15 volts, +15 volts and a +5 volts for proper operation. These potentials are obtained from a conventional power source and applied via input means having capacitive filter networks adapted to eliminate unwanted frequencies which may be modulating the DC lines.

The output of analog-to-digital converter 28 applied to the four digital signal lines is applied as inputs to register 37 at pins 3, 4, 5 and 6 thereof. This register may be a conventional storage register such as, for example, model 8551 manufactured by TTL, which provides an unregulated 12 volt output at lines 11, 12, 13 and 14 in response to the digital inputs from the analog-to-digital converter. The four outputs of register 37 are utilized to control solenoid valves at the quenching station and therefore must remain relatively stable for predetermined time increments to prevent irregular and excessive action of the valves. Thus, register 37 acts as a buffer between converter 28 and the solenoid valves and maintains the control signals in the desired steady state so as to prevent erratic valve action as the analog-to-digital converter 28 is being updated.

When the analog-to-digital converter 28 is updated, a narrow spike status signal is produced at pin 1 as soon as the converter has completed digitizing the analog input. This status signal is applied to pin 7 of register 37, clearing that register and allowing it to be updated to the latest digital output of analog-to-digital converter 28. The status signal is also applied to a delay circuit. To this end, the status signal is applied to one input of NAND gate 38 which has its other input and its output interconnected with NAND gate 39 through an RC circuit to form a one-shot multivibrator. The output of the multivibrator is used to trigger NAND gate 40 which is adapted to function as an inverter. NAND gates 38, 39 and 40 are combined for convenience on a TI integrated circuit chip model 7400.

The status signal output at pin 1 of the analog-to-digital converter 28 causes NAND gates 38 and 39 to produce a single pulse which is applied to timer 41 via inverter 40. Timer 41 may be a conventional Signetics timer model 555 or the like which produces a time related output which is determined by the RC circuit comprised of variable resistor 42, resistor 43 and capacitor 44.

The output of timer 41 is taken at pin 3 and applied to pin 3 of the analog-to-digital converter 28. This signal at pin 3 of the analog-to-digital converter causes the converter to clear the output and begin a new conversion of the analog input. Thus the status signal from pin 1 of the analog-to-digital converter is applied through a time delay means to the reset input of the analog-to-digital converter. The time delay is typically in the order of 2 seconds, permitting the volume of water applied to the hot sand to be changed or updated at that frequency. However, the control components of the timer, resistor 42 in combination with resistor 43 and capacitor 47 are selected such that the timer may delay recycling or resetting of the analog-to-digital converter for as long as 10 seconds. This delay in updating the analog-to-digital converter also permits time for the mass of sand sensed at the transducers to travel along the conveyor to reach the water quenching zone of the conveyor system which may be physically displaced from the sensors before the water nozzles are activated in response to the sensed BTU level of that specific mass of sand. In the preferred embodiment, the volume and temperature sensors are located as close as possible to the water quench station.

NAND gate 45 is a power up gate system which applies a pulse when power is first applied to the system that causes register 37 to be cleared immediately to prevent sporatic energization of the water control solenoids when the system is first activated. To this end, the inputs of gate 45 are connected to the 5 volt power source applied through a 10,000 ohms resistor and the resultant clear signal is applied to input 12 of register 37.

As was previously stated, one output of the level responsive differential amplifier 14 is applied through resistor 17 to inhibit operation of the system when a predeterminmed minimum amount of sand is present on the conveyor. This circuit functions by applying the signal through resistor 17 to the negative input of differential amplifier 46 which acts as a low level detector. An output from 46 is generated by the differential amplifier as a function of the comparison of the level of the sand represented by the signal input at J2 and the positive voltage supplied to the positive input through the voltage divider network comprised of resistors 47, 48, 49, 50 and 51. The output signal is applied to pin 1 of register 51. This signal at pin 1 of the register clears the register output and maintains the output of the zero or cleared condition until the signal is removed. This prevents spraying water onto the conveyor belt when a predetermined minimum volume of sand is present regardless of the amount of heat which may be generated by that sand. The advantage of such a low level control should be readily apparent. For example, the possibility of mudding or agglomeration which occur even with the addition of small amounts of water is minimized.

The system requires a regulated −10 and +10 voltage source and this is provided by filtering the −15 and +15 volt inputs at jacks J3 and J4 through an RC filter and applying them to a conventional voltage regulator such as a precision monolithic model REF-01 indicated in FIG. 2 as 52. The output of regulator 52 is a +10 volts which is applied to inverter 53 to produce the required −10 volts. Inverter 53 may be a National Semiconductor integrated circuit LM324 or the like.

The 5 volt potentials required by various integrated circuits incorporated in the system are developed by standard resistive voltage dividers incorporated into the power supply but not illustrated in FIG. 2. FIG. 3 illustrates the power supply in block diagram form depicting the −5 and +5 volt outputs and the −15 and +15 volt outputs. The power supply of 60 of FIG. 3 may be any one of a number of standard, commercially available power supplies which generate DC potentials from an AC source such as 110 or 220 volts AC. These potentials are applied to the circuitry illustrated in FIG. 2 and represented in FIG. 3 as a digital signal processor.

The outputs of register 37 of FIG. 2 at pins 11, 12, 13 and 14 are identified in FIGS. 2 and 3 as outputs 62, 63, 64 and 65. These outputs, in a preferred embodiment are approximately 0 or an unregulated 12 volts depending on whether or not relays 66, 67, 68 or 69 are to be energized. In one embodiment, relays 66 through 69 are standard DC relays having normally open contacts 71, 72, 73 and 74, respectively. Contacts 71, 72, 73 and 74 are adapted to be closed when the associated relay is energized by an output at lines 62, 63, 64 or 65.

Contacts 71–74 connect the associated solenoids to the alternating current supply lines through fuses 75 through 78 to cause the associated water control solenoids 79, 80, 81 and 82 to be energized in response to the output of register 37 at lines 62–64. Each water control solenoid valve controls the water supply to a nozzle of a predetermined flow capacity so as to permit precise control of the amount of quenching water added to the hot sand. An indicator lamp 83 through 86, is provided in parallel with each water control solenoid to provide a visual indication at the quenching station of which valves are active.

In the preferred embodiment of the present invention, relays 66 through 69 and contacts 71 through 74 are solid state relays of the type produced by Teledyne adn identified by model number 601–1403. These commercially available solid state relays utilize optically coupled isolators to turn on SCR's which in turn complete a circuit to the solenoids. To more clearly visualize this embodiment, relay coils 66 through 69 are replaced by optically coupled isolators and contacts 71 through 74 are substituted by SCR's.

The four solenoid valves have attached thereto spray nozzles, each of which is preferably sized on a digital basis. For example, one nozzle may deliver 1 gal/min; a second nozzle 2 gal/min, a third nozzle 4 gal/min, and a fourth nozzle 8 gal/min. The sizing of the nozzles may be varied to fit a particular situation, but preferably should be digitalized to correspond to the outputs of the analog-to-digital converter 28. In another embodiment of the invention, converter 28 provides a six output parallel signal in which case six solenoid control valves are provided. As should be apparent, the number of valves used can be varied depending on the combination of increments of water coolant to be delivered.

We claim:

1. In a control system for an apparatus used for cooling recycled foundry said in a sand cast foundry, having:

conveyor for transporting the foundry sand material, a non-contact depth gage disposed along the path of the conveyor for generating an electrical signal representing the depth of the material on said conveyor;

a non-contact temperature sensor disposed along the path of the conveyor for generating an electrical signal representing the temperature of the material on said conveyor as a function of heat radiated by said material;

a spray means for spraying water on the mold forming material on said conveyor positioned downstream from said depth gage and temperature sensor; and a control means responsive to said depth gage signal and said temperature sensor signal for controlling the volume of cooling agent dispensed from said spray means; the improvement comprising, a multiplier for generating an analog signal from said depth gage signal and said temperature sensor signal; an analog-to-digital converter responsive to said multiplier analog signal for producing a plurality of digital signals as a function of the magnitude of said analog signal; and switching means responsive to said outputs of said analog-to-digital converter for activating said spray means.

2. An apparatus as defined in claim 1 wherein said spray means comprises:

a plurality of spray nozzles;

a solenoid controlled valve for each of said spray nozzles;

a solid state switching means for each of said solenoid valves responsive to said digital signals generated by said control means for controlling individual valve actuation.

3. An apparatus as defined in claim 2 further including inhibiting means responsive to said depth gage signal for inhibiting said spray means when the level of said sand is below a predetermined level.

4. An apparatus as defined in claim 3 wherein said control signals generated by said control means are coupled to said solenoid valve controlling solid state switches via optical coupling means.

5. An apparatus as defined in claim 2 wherein said nozzles are sized on a digital basis.

* * * * *